Nov. 25, 1969   R. L. HOLLOWAY   3,480,033
INHALATION-EXHALATION VALVE
Filed Aug. 10, 1967   3 Sheets-Sheet 1
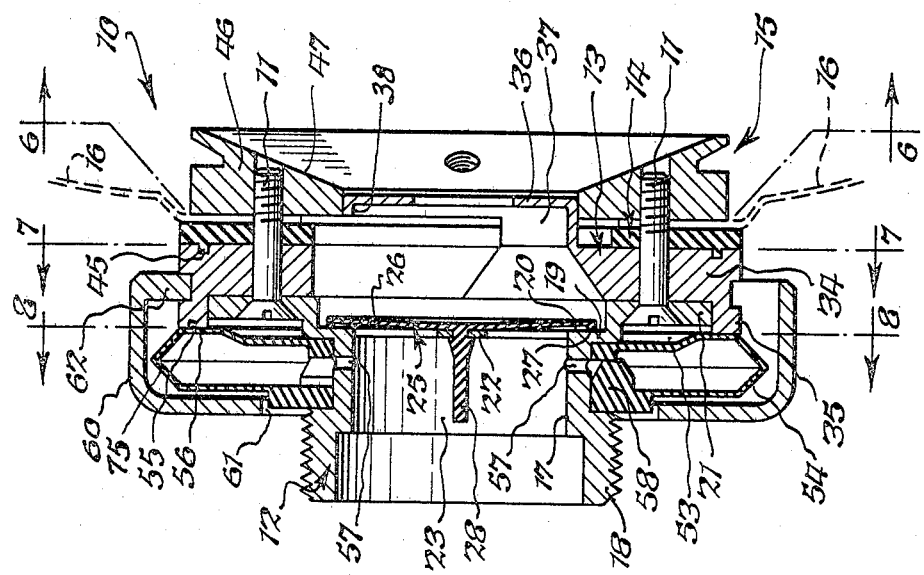
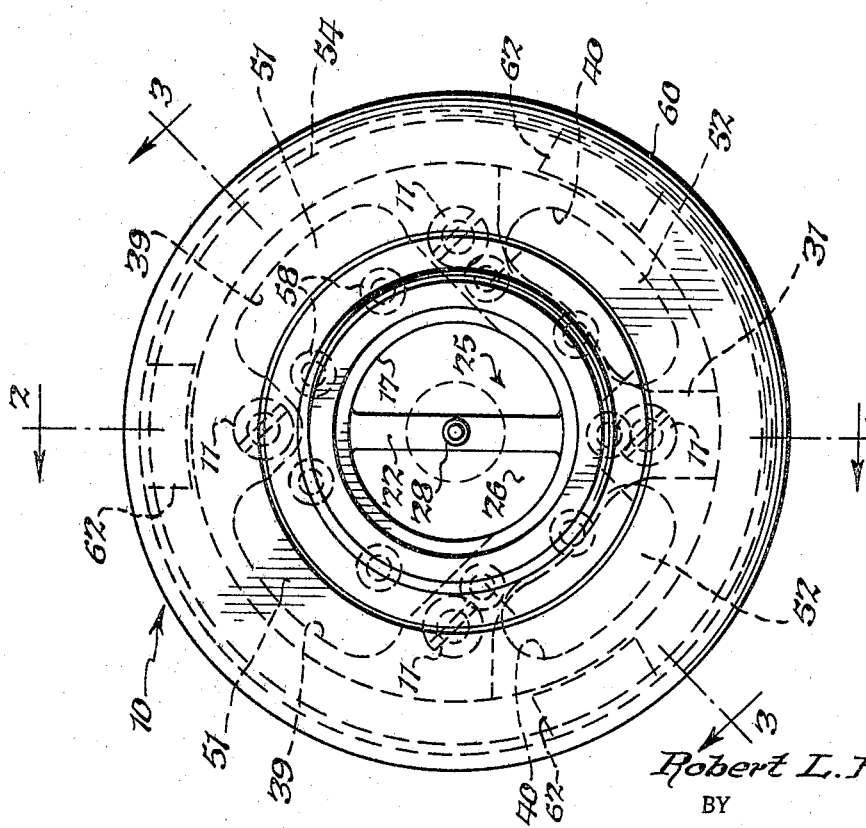
INVENTOR.
Robert L. Holloway
BY
Christel & Bean
ATTORNEYS.

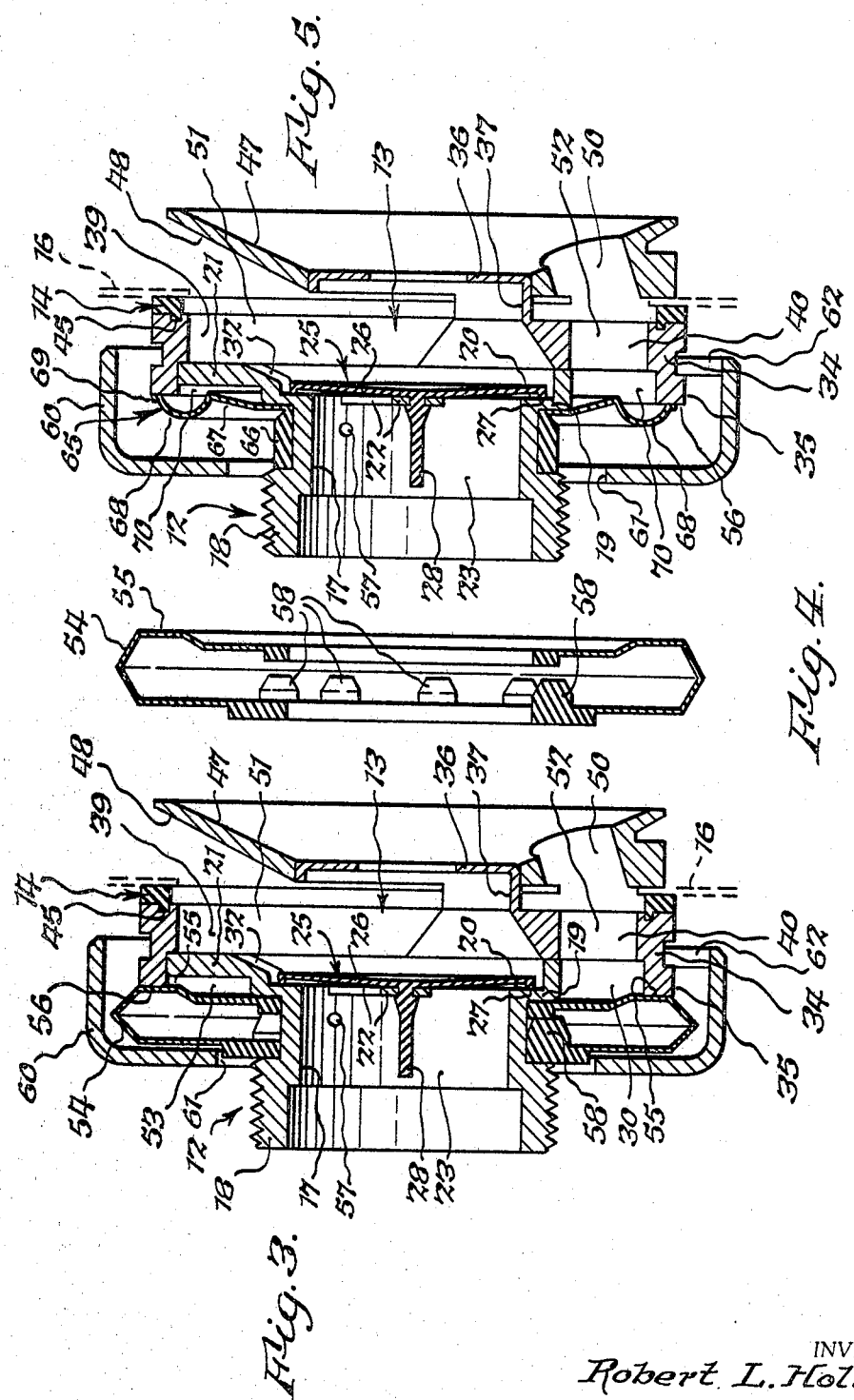

Nov. 25, 1969  R. L. HOLLOWAY  3,480,033
INHALATION-EXHALATION VALVE
Filed Aug. 10, 1967  3 Sheets-Sheet 3
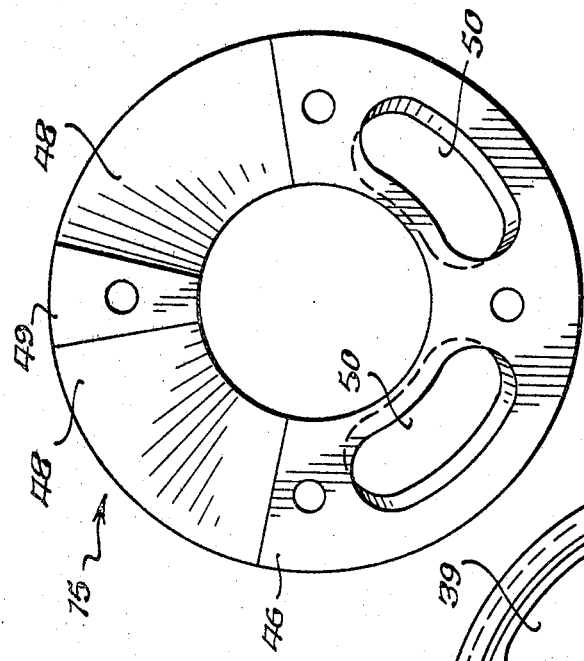
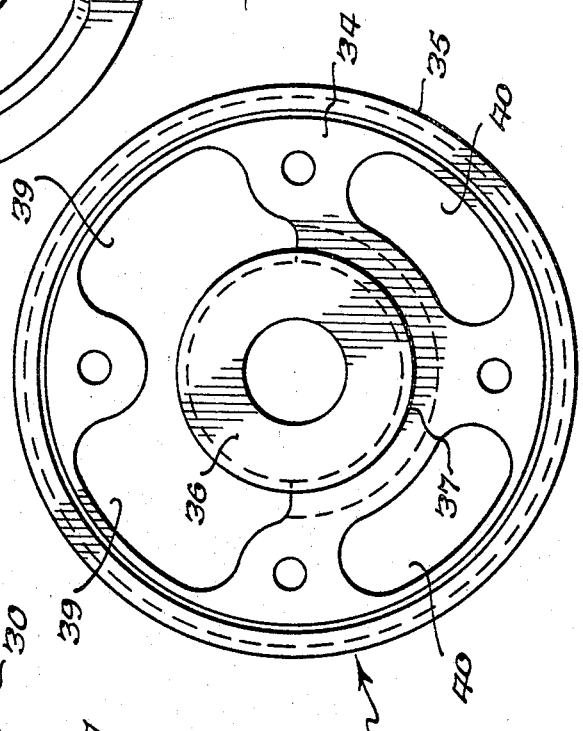
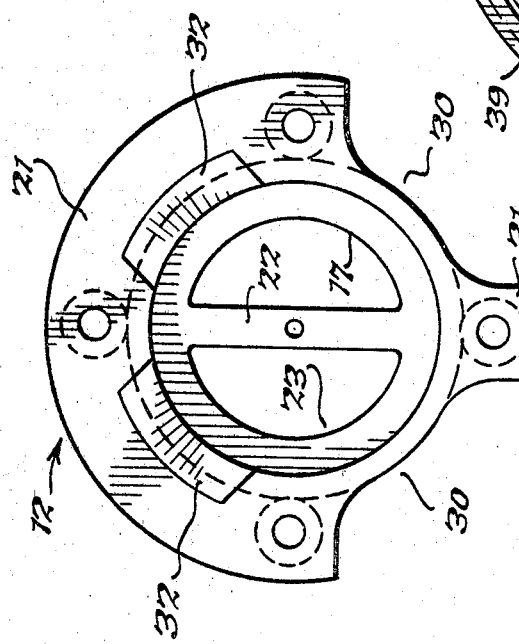
INVENTOR.
*Robert L. Holloway*
BY
*Christel & Bean*
ATTORNEYS.

United States Patent Office 3,480,033
Patented Nov. 25, 1969

3,480,033
INHALATION-EXHALATION VALVE
Robert L. Holloway, Snyder, N.Y., assignor, by mesne assignments, to "Automatic" Sprinkler Corporation of America, doing business as The Illuminating Building, Cleveland, Ohio, a corporation of Ohio
Filed Aug. 10, 1967, Ser. No. 659,766
Int. Cl. A61m 15/00; G05d 7/01
U.S. Cl. 137—102                8 Claims

ABSTRACT OF THE DISCLOSURE

The inhalation-exhalation valve comprises a valve body having a breathing fluid inlet passage including a branch conduit for transmitting breathing fluid along the face mask to prevent fogging. An exhaust conduit opens from the face mask through the valve body into an annular chamber. Exhaled air is vented from the annular chamber under control of an inflatable annulus seated in sealing engagement with an annular valve seat. Breathing fluid at inlet pressure flows from the inlet passage through an orifice in the valve body into the annulus to maintain the same inflated and in sealing engagement against the seat. The exhalation pressure acts on an annulus area smaller than the annulus area subject to inlet pressure whereby exhalation pressure in excess of inlet pressure is required to unseat the annulus.

BACKGROUND OF THE INVENTION

This invention relates to a breathing fluid control valve for a face mask and in particular to a new and useful inhalation-exhalation valve arranged to maintain a positive pressure within the mask.

Inhalation-exhalation valves which vent against pressure, thereby maintaining a positive pressure within the mask, pose problems. Often they provide a spring-biased valve member slidable in an exhaust chamber, which can produce frictional contact resulting in sticky valve action, irregular opening and closing of the valve. Another problem is the tendency of some valves to dribble or chatter when the valve operates near its opening or closing pressures. Manufacturing tolerances often are quite critical and the fabrication of such valves relatively expensive.

SUMMARY OF THE INVENTION

It is a primary object of the present invention to provide an inhalation-exhalation valve which requires a positive exhalation effort against inlet pressure to vent exhaled air, and which operates and is arranged in a manner whereby dribbling of fluid past the valve and chattering of the valve is precluded.

It is another object of the present invention to provide an inhalation-exhalation valve having the foregoing characteristics wherein a flexible bladder communicates with the breathing fluid inlet and is inflated to directly seal against the exhaust passage whereby metal to metal contact between valve parts is eliminated.

It is yet another object of the present invention to provide an inhalation-exhalation valve having the foregoing characteristics which is relatively simple in construction and relatively easily and inexpensively fabricated.

It is a further object of the present invention to provide an inhalation-exhalation valve having the foregoing characteristics wherein the exhaust valve is readily and easily interchangeable with other types of exhaust valve members to provide different modes of operation.

Still another object of my invention is to provide the foregoing in a valve which diverts a portion of the inlet fluid across the interior of the mask for de-fogging.

BRIEF DESCRIPTION OF THE DRAWING

FIG. 1 is an end elevational view of one form of inhalation-exhalation valve constructed in accordance with the present invention;

FIG. 2 is a cross sectional view thereof taken about on line 2—2 of FIG. 1 showing the valve as applied to a face mask which is schematically illustrated by the broken lines;

FIG. 3 is a cross sectional view thereof taken about on line 3—3 of FIG. 1;

FIG. 4 is a cross sectional view of the inflatable bladder used in the valve construction illustrated in FIGS. 1–3;

FIG. 5 is a cross sectional view like that of FIG. 3 but with an unpressurized valve member substituted for the inflatable bladder of FIG. 4;

FIG. 6 is an end elevational view of the deflector member taken about on line 6—6 of FIG. 2;

FIG. 7 is an end elevational view of the central housing taken about on line 7—7 of FIG. 2; and FIG. 8 is an end elevational view of the valve housing taken about on line 8—8 of FIG. 2.

DESCRIPTION OF THE PREFERRED EMBODIMENT

There is shown in FIGS. 1–3 an inhalation-exhalation valve of my invention comprising a valve body generally designated 10 assembled by bolting together the several valve parts including an external valve housing member 12, a housing member 13, a gasket 14 and a deflector member 15. A face mask body portion, such as a transparent mask bubble, is schematically indicated at 16 and has a lower central opening, the margin of which is clamped between deflector 15 and gasket 14 to form an air tight seal. Housing 12 and 13 and gasket 14 are thus located externally of the face mask whereas deflector 15 projects interiorly of the mask toward a wearer's face, not shown, substantially in horizontal registry with a wearer's nose and mouth.

Valve housing 12 comprises a sleeve 17 having a diametrically enlarged, externally threaded, outer end 18 adapted for attachment to a breathing fluid hose, not shown, for supplying breathing fluid to the wearers of face mask 16. Alternately, a filter canister, not shown, can be threaded on end 18 for supplying filtered ambient air to the user. The inner end of sleeve 17 terminates in a diametrically enlarged, radical flange which is stepped to provide an inner flange portion 19 forming an annular valve seat 20 and an axially offset, outer flange portion 21 which is countersunk to receive the heads of bolts 11. A valve support arm member 22 having a central opening extends diametrically across seat 20. A flapper check valve 25 is positioned across the inlet passage 23 formed through sleeve 17 and comprises valve disk 26, preferably formed of neoprene rubber or the like having an axially extending peripheral margin 27 and a central, similarly axially extending stem 28. Stem 28 has an enlarged peripheral shoulder adjacent the base thereof and is inserted through the central opening in valve support arm 22 with the shoulder locking behind the arm. Margin 27 is thus positioned to seal against valve seat 20 and prevent exhalation through inlet passage 23.

Portions of the lower quadrants of outer flange portion 21 are cut away as indicated at 30 in FIGS. 3 and 8, leaving a bolt-receiving leg portion 31 therebetween. Portions of the inner face of flange portion 21 on the upper quadrants thereof are tapered or beveled radially outwardly as shown at 32. Flange portion 21 is shaped in the foregoing manner to form portions of inlet and exhaust conduits more particularly described hereinafter. Portions of flange 21 between cut-outs 30 and tapered portion 32, including legs 31, are bored to provide openings which receive bolts 11 for assembling housing 12 to the other valve parts.

Central housing member 13 comprises an annular, disk-like member 34 having rim portion 35 extending axially outwardly from a side face thereof, and a central, integral, annular disk 36 offset axially inwardly from the other side face thereof by an arcuate wall 37 adjacent the lower, inner periphery of member 34.

Disk 36 is alined with the opening through member 34 and with inlet passage 23. A peripheral flange 38 extends completely about disk 36. A pair of recesses 39 (FIGS. 3 and 7) in the upper quadrants of disk member 34 extend radially outwardly from the inner periphery of the latter to adjacent rim portion 35, recesses 39 being in open communication with the central passage through the lower quadrants of disk member 34 and unlike recesses 39, are not in communication with the central opening through disk member 34. Bore holes are provided between the portions 39 and 40 for receiving bolts 11.

Gasket 14 comprises a disk preferably formed of neoprene rubber of the like, having the same general outline as disk member 34 (see FIG. 7). Gasket 14 has openings formed therethrough corresponding to the central opening of the recess openings 39 and 40 formed through disk member 34. That is, gasket 14 has a central opening having radial recesses extending therefrom in the upper quadrants and a pair of openings in the lower quadrants, with sealing portions separating its lower openings from the central opening. Gasket 14 is located on housing 13 by mating annular rim and slot formations provided on abutting faces of gasket 14 and housing 13, as indicated at 45, gasket 14 having suitably located openings for receiving bolts 11.

Deflector 15 comprises a collar 46 having a central opening adapted to snugly receive flange 38 and disk 36. The annular outer face collar 46 is conically shaped as at 47. Upper quadrantal inner face portions of deflector 15 are tapered inwardly to form flared grooves 48 which extend radially from the central opening of deflector 15 to the periphery thereof adjacent its face 47. A boss 49 projects from the upper face of deflector 15 between grooved portions 48 and boss 49 and collar 46 are suitably bored to receive anchor bolts 11. A pair of inclined spaced arcuate passages 50 are formed through the lower quadrants of deflector 15 and open through the tapered outer face 47 thereof.

Valve body 10 is assembled by alining the bore holes and the corresponding upper and lower openings and recesses of the several parts in registry with one another, positioning outer flange 21 of holder 12 within rim 35 of housing 13, positioning gasket 14 against the opposite face of housing 13, locating deflector 15 on the interior side of mask or bubble 16, and clamping the assembly together by bolts 11. In this manner, a breathing fluid inlet conduit is formed which extends centrally through valve body 10 which includes inlet passage 23 and the central restricted opening in disk 36. A pair of branch inlet conduits 51 (FIG. 3) are formed by paired recesses 39 through housing 13 which register on opposite sides thereof with the paired upper tapered portions 32 of housing 12 and with grooves 48 of deflector 15 respectively. As breathing fluid passes axially through valve body 10, the constricted opening through disk 36 deflects a portion of the breathing fluid through branch conduits 51 which open into the interior of the mask directly inwardly of bubble 16. The breathing fluid issuing from branch conduits is thus deflected to flow upwardly along the inner face of bubble 16 and acts to prevent fogging of the face mask bubble by water vapor contained in the user's exhalation.

The foregoing assemly also forms a pair of exhaust conduits 52 through the registering paired passages 50 and openings 40 of deflector 15 and housing 13, respectively, and the registering cut away portions 30 of valve housing 12. Exhaust conduits 52 thus extend from the lower portion of tapered face 47 of deflector 15 through the lower portions of valve body 10 and open forwardly through the cut away portions 30 of outer flange 21 to empty into an annular chamber 53. A valve member 54 which is responsive to inlet pressure controls venting of the exhaled air.

Valve member 54 comprises a tubeless tire-like, inflatable bladder, of neoprene rubber of like resiliently yieldable material having axially spaced inner peripheral portions snugly encircling sleeve 17 and seating against the shoulders provided by the outer end 12 and the external face of inner flange 19, respectively, in sealing engagement therewith. Bladder 54 is formed to provide an annular, flat portion 55 along one side thereof adjacent its periphery providing an annular sealing face which, when bladder 54 is inflated, bears against an annular seat 56 formed on the outer face of rim 35. A pair of orifices 57 open through sleeves 17 between the spaced inner peripheries of bladder 54, supplying the latter with breathing fluid at inlet pressure. A plurality of circumferentially spaced frustoconically shaped buttons 58 project from an interior side of bladder 54 adjacent the inner periphery thereof and extend toward the other side of bladder 54, whereby the inner peripheries of bladder 54 are maintained in axially spaced relation one from the other. In this manner, orifices 57 remain open for passage of breathing fluid under inlet pressure into bladder 54. The buttons 58 also maintain the inner peripheries of bladder 54 substantially abutting outer end 12 and inner flange 19 and locate bladder 54 so that sealing face 55 bears against seat 56 when bladder 54 is inflated.

A cup shaped, cylindrical cover member 60, having a central opening 61, encloses bladder 54. Cover member 60 has inturned flanges 62 circumferentially spaced about its inner periphery which engage in a peripheral slot formed about housing 13. Cover member 60 acts as a guard for bladder 54, and is open at both ends to vent the exhaled air from annular chamber 53 upon unseating of bladder face 55 from seat 56.

Face 55 of bladder 54 is urged toward seat 56 by the resilient, shape sustaining nature of bladder 54, and is held in sealing engagement therewith by the breathing fluid in bladder 54 at inlet pressure. The area of bladder 54 exposed to inlet pressure exceeds that exposed to exhalation pressure. Dribbling of fluid between face 55 and seat 56 is thereby prevented. When the pressure in chamber 53 exceeds the inlet pressure by the significant amount required to overcome this difference in area, the outwardly convergent side wall 75 of bladder 54 acts like a spring bellows and permits face 55 to move away from seat 56 while maintaining a nearly parallel relation therebetween. Thus, face 55 which is axially offset from the seat of that face of bladder 54 is well defined and moves between definite open and closed positions relative to seat 56.

The inlet fluid pressure within bladder 54 urges its inner peripheral portions into sealing engagement against the shoulders provided by portions 18 and 19, in the manner of tubeless tire, and spacers 58 prevent them from collapsing upon opening the valve.

A second type of valve member may be used with the foregoing valve body construction when positive pressure operation is not desired. This is illustrated in FIG. 5 wherein the several parts comprising the valve body are identical to the valve body construction illustrated in FIGS. 1–3 and therefore are assigned like reference numerals. The valve member shown in FIG. 5 generally designated 65 comprises a collar 66 which is adapted to fit snugly about sleeve 17 and extend between the inner shoulder on outer end 12 and the external face of inner flange 19. An annular flapper valve 67 extends radially from the inner end of collar 66 and has a raised arcuate outer rim portion 68, the outer peripheral edge 69 thereof being formed to seal against annular seat 56. Flapper valve 67 preferably is formed of neoprene rubber or the like and is slightly frusto-conically shaped whereby sealing edge 69 is slightly biased into sealing engagement with seal 56. Flapper valve 67, including rim portion 68 and the outer face of outer flange portion 21 form an annular chamber 70 into which empty the exhaust conduits 52.

In use, inhalation unseats valve disk 26 from seat 20 whereby breathing fluid flows through conduit 23 into face mask 16. In the form illustrated in FIGS. 1–4, inlet breathing fluid also flows through orifices 57 into tire-like bladder 54 and inflates the same, thereby causing sealing face 55 to seal against seat 56 and preventing the escape of air from within face mask 16 through exhaust conduits 51 during the inhalation portion of breathing cycle. When exhaling, the exhaled air flows through paired exhaust conduits 52 into annular chamber 53. The area of bladder 54 exposed to the exhalation pressure is less than the area thereof exposed to the inhalation pressure within bladder 54. Consequently, a positive exhalation effort in excess of inlet pressure is required in order to build up sufficient pressure within chamber 53 to unseat bladder 54 and vent exhaled air to the atmosphere through the open ends of guard member 60. A positive pressure is thereby maintained in mask 16. Exhalation pressure is prevented from further pressurizing bladder 54 by the closing of valve disk 26.

In the form illustrated in FIG. 5, collar 66 blocks orifices 57 whereby exhaled air flows through paired exhaust conduits 52 into annular chamber 70 and acts only against the slight bias of flapper valve 67 and ambient pressure acting against the outer face of the latter. The area of valve 67 exposed to exhalation pressure is less than that exposed to ambient atmosphere pressure, whereby a positive exhalation effort is required to unseat flapper valve 67 and vent exhaled air through the open ends of guard member 60.

It is significant that valve member 65 is interchangeable with bladder member 54. Either member can be easily slipped over outer end 18 to provide either mode of operation. The sleeve construction including outer end 18 and inner flange portion 19 provides a peripheral slot which complements the collar construction of valve member 65 and the inner peripheral construction including buttons 58 of bladder 54 whereby interchangeability of the valve members is facilitated.

It is apparent that the objects of my invention have been fully accomplished. The present construction prevents chattering and dribbling past the exhaust valve, and provides ready interchangeability between positive pressure and nonpressurized types of operation, all in a dependable, relatively simple and inexpensive construction. While only one embodiment has been disclosed in detail, that has been done by way of illustration and I intend to be limited only as required by the appended claims.

What I claim is:

1. An inhalation-exhalation valve for a breathing mask comprising a valve body having breathing fluid inlet conduit means and exhaust conduit means, inlet valve means controlling fluid flow in said inlet conduit means, a valve seat in said exhaust conduit means, a flexible inflatable valve member positioned to seat against said valve seat and close said exhaust conduit means, means placing said valve member in communication with said inlet conduit means on the upstream side of said inlet valve means, whereby said valve member is held closed by inlet fluid pressure, said inflatable valve member being movable from said valve seat in response to exhalation pressure, in excess of inlet pressure to vent exhaled air from said exhaust conduit means, wherein said inflatable member is a tire-like annulus having axially spaced inner peripheries mounted about said valve body, said communication means comprising an orifice opening through said valve body from said inlet conduit into said annulus between the inner peripheries thereof, said tire-like annulus and said valve seat having complementary annular sealing surfaces, and means spaced about the inner periphery of said tire-like member spacing the inner peripheries thereof one from the other to prevent collapse of said inflatable tire-like member.

2. A valve according to claim 1, wherein a substantially greater area of said valve member is exposed to inlet pressure than to exhaust pressure, requiring a positive exhaust pressure in excess of inlet pressure to open said valve.

3. A valve according to claim 1, wherein said inflatable valve member is removable from said valve body for replacement by a simple flapper type of valve having a collar closing said orifice opening.

4. An inhalation-exhalation valve for a breathing mask comprising a valve body having breathing fluid inlet conduit means and exhaust conduit means, inlet valve means controlling fluid flow in said inlet conduit means, a valve seat in said exhaust conduit means, a flexible inflatable valve member positioned to seat against said valve seat and close said exhaust conduit means, means placing said valve member in communication with said inlet conduit means on the upstream side of said inlet valve means, whereby said valve member is held closed by inlet fluid pressure, said inflatable valve member being movable from said valve seat in response to exhalation pressure in excess of inlet pressure to vent exhaled air from said exhaust conduit means, wherein said inflatable member is a tire-like annulus having axially spaced inner peripheries mounted about said valve body, said communication means comprising an orifice opening through said valve body from said inlet conduit into said annulus between the inner peripheries thereof, said tire-like annulus and said valve seat having complementary annular sealing surfaces, wherein said valve body has a pair of opposed annular shoulders against which said inner peripheries abut in sealing engagement therewith.

5. A valve according to claim 4, wherein a substantially greater area of said valve member is exposed to inlet pressure than to exhaust pressure, requiring a positive exhaust pressure in excess of inlet pressure to open said valve.

6. A valve according to claim 4, wherein said inflatable valve member is removable from said valve body for replacement by a simple flapper type of valve having a collar closing said orifice opening.

7. An inhalation-exhalation valve for a breathing mask comprising a valve body having breathing fluid inlet conduit means and exhaust conduit means, inlet valve means controlling fluid flow in said inlet conduit means, a valve seat in said exhaust conduit means, a flexible inflatable valve member positioned to seat against said valve seat and close said exhaust conduit means, means placing said valve member in communication with said inlet conduit means on the upstream side of said inlet valve means, whereby said valve member is held closed by inlet fluid pressure, said inflatable valve member being movable from said valve seat in response to exhalation pressure in excess of inlet pressure to vent exhaled air from said exhaust conduit means, wherein said valve body has a branch inlet conduit located to open adjacent the inner surface of a breathing mask above said valve, and means in said inlet conduit means for deflecting a portion of the breathing fluid through said branch conduit for defogging the mask.

8. A valve according to claim 7 wherein said branch conduit comprises a pair of conduits disposed along the upper portion of said valve body and communicating with said inlet conduit means on the downstream side of said inlet valve member.

References Cited

UNITED STATES PATENTS 2,954,793 10/1960 Seeler _____ 137—102
3,232,304 2/1966 Koester _____ 137—102

WILLIAM F. O'DEA, Primary Examiner

WILLIAM H. WRIGHT, Assistant Examiner

U.S. Cl. X.R.

137—63, 512.2; 128—142.2